3,123,528
NEW THERAPEUTIC COMPOSITIONS
Albert Henry Fenton, Nottingham, England, assignor to Boots Pure Drug Company Limited, Nottingham, England, a British company
No Drawing. Filed June 29, 1959, Ser. No. 823,325
5 Claims. (Cl. 167—55)

This invention relates to new pharmaceutical preparations which have been found to possess valuable properties.

In British patent specification Number 794,402 there are described disinfecting compositions in which the active ingredient is 3:4-dichlorobenzyl alcohol.

It has now been found that a related compound 2:4-dichlorobenzyl alcohol possesses marked lethal activity against a wide range of bacteria, fungi and yeasts and that this compound is surprisingly less toxic than the corresponding 3:4-dichlorobenzyl alcohol when applied to animal or human tissue. Compositions containing this compound can be employed to combat bacterial, fungal and yeast infections of the ear, throat, scalp and skin. Accordingly the present invention comprises a pharmaceutical composition for oral or topical administration which comprises 2:4-dichlorobenzyl alcohol together with a pharmaceutically acceptable diluent or carrier.

Thus the compositions of the invention include mouth washes, toothpastes, pastilles, lozenges and boiled sweets for medication of the throat, ointments, jellies and lotions for the treatment of the skin, eardrops and medicated powders all of which contain 2:4-dichlorobenzyl alcohol.

Although the compound 2:4-dichlorobenzyl alcohol is an extremely active bactericide and fungicide it has a number of disadvantages often associated with such compounds which become apparent in specific formulations. For example 2:4-dichlorobenzyl alcohol is completely unpalatable in the undiluted state and this unpalatability persists in e.g. boiled sweets which contain sufficient of the active ingredient to ensure a rapid lethal action against oral pathogens when the boiled sweet is sucked. It has also been noted that some pathogens develop a certain amount of drug resistance to 2:4-dichlorobenzyl alcohol.

It is an object of the present invention to provide pharmaceutical compositions for oral administration containing 2:4-dichlorobenzyl alcohol which act rapidly against oral pathogens and yet are palatable.

It is a further object of the present invention to provide pharmaceutical compositions based on 2:4-dichlorobenzyl alcohol with which the drug resistance of pathogens is less easily produced than would be anticipated from products based on this active compound.

If the quantity of 2:4-dichlorobenzyl alcohol in e.g. a boiled sweet formulation is reduced until the taste of the sweet is acceptable it is found that the product has an unacceptably low activity.

Similarly a boiled sweet containing sufficient amyl-m-cresol to render it palatable also has an unacceptably low activity. Amyl-m-cresol is a well-known bactericide and fungicide which when present in highly active quantities in e.g. boiled sweet formulations is unpalatable.

We have now discovered that if a boiled sweet is prepared containing a palatable quantity of 2:4-dichlorobenzyl alcohol and a palatable quantity of amyl-m-cresol, surprisingly, the overall palatability of the sweet remains acceptable whilst the activity of the mixture against oral pathogens is extremely high. Furthermore, we have discovered that micro-organism such as Monilia, Staphylococcus and Streptococcus exhibit a reduced tendency to become resistant to either 2:4-dichlorobenzyl alcohol or to amyl-m-cresol where one is present with the other; such a discovery is, of course, applicable to all types of compositions comprising 2:4-dichlorobenzyl alcohol.

Although 2:4-dichlorobenzyl alcohol is bactericidal and fungicidal we have found that the value of certain compositions of the present invention may be enhanced by the inclusion of a substance which exhibits antibacterial and/or antifungal properties, e.g. hexachlorophene which is compatible with 2:4-dichlorobenzyl alcohol.

The compositions of the invention which are suitable for oral use may take the form of boiled sweets, tablets, lozenges and pastilles continuing 2:4-dichlorobenzyl alcohol and preferably amyl-m-cresol and tartaric acid or equivalent compounds, and may be prepared by methods well known in the art. The diluents which may be employed in the preparation of such compositions include those solid diluents which are non-toxic and which slowly dissolve in human saliva for example, sucrose. In addition to diluents which are incorporated for flavouring purposes it is occasionally desirable but not essential that the compositions also comprise a binding agent, for example gum acacia, and a minor quantity of lubricant for example stearic acid or a metal salt thereof. The concentration of 2:4-dichlorobenzyl alcohol employed in the lozenges, etc. may vary according to the requirements of the particular medication for which they are intended.

We have found that a boiled sweet of approximately 3 grams weight comprising a sugar base and between 0.25 and 3 mg. (preferably 0.75 to 1.5 mg.) of 2:4-dichlorobenzyl alcohol, between 0.1 and 2 mg. (preferably 0.5 to 1 mg.) of amyl-m-cresol and between 10 and 50 mg. (preferably 20 to 30 mg.) of tartaric acid is a very convenient and favourable composition for use in medication of the throat. The tartaric acid may be replaced by other pharmaceutically acceptable acids such as citric acid and the amyl-m-cresol may be replaced by other antibacterial agents such as hexylresorcinol or chlorthymol. If desired the compositions of the invention may also contain other active ingredients. Thus it has been found that the substance saligenin (o-hydroxybenzyl alcohol) which has local anaesthetic activity can be incorporated to give oral compositions which are particularly valuable in that they possess both bactericidal properties and local anaesthetic activity.

The activities of boiled sweets of the present invention were evaluated against the activities of other commerically available antiseptic lozenges containing well-known antibacterial agents. Table I includes the results of these tests which were carried out in the following manner.

The in vitro activity of boiled sweets comprising 2:4-dichlorobenzyl alcohol and amyl-m-cresol against a wide range of organisms was determined by dissolving one sweet in 5 ml. of diluted saliva and the times taken to kill inocula of pure cultures of different organisms were determined. The same test procedure was followed evaluating lozenges containing tyrothricin, dequalinium hydrochloride, domiphen bromide and chlorhexidine dihydrochloride. On examining Table I it will be seen that the boiled sweets of the present invention were lethal to all the bacteria used in the test within one minute; even *Monilia albicans* was killed in five minutes. On the other hand all of the other four well-known commercially available compositions were virtually inactive against some of the organisms.

that a lotion containing 0.5% of this substance is efficacious in the treatment of the scalp.

The following non-limitative examples illustrate the invention.

TABLE I

| Organisms | A | B | C | D | E |
|---|---|---|---|---|---|
| | Time taken to kill micro-organism | | | | |
| *Staphylococcus aureus* | 1 min | Not killed in 30 mins. | Not killed in 30 mins. | 2 mins | Not killed in 30 mins. |
| *Streptococcus pyogenes* (haemolyticus) | 1 min | 5 mins | 5 mins | 1 min | 2 mins. |
| Pneumococcus type | 1 min | 10 mins | 10 mins | 2 mins | 1 min. |
| *Haemophilus influenzae* | 1 min | 5 mins | 1 min | 1 min | 5 mins. |
| *Haemophilus parapertussis* | 1 min | Not killed in 30 mins. | 15 mins | 10 mins | 5 mins. |
| *Salmonelle typhi* | 1 min | do | Not killed in 30 mins. | Not killed in 30 mins. | 20 mins. |
| *Escherichia coli* | 1 min | do | do | do | Not killed in 30 mins. |
| *Pseudomonas aeruginosa* (pyocyanea) | 1 min | do | do | do | Do. |
| *Monilia albicans* | 5 mins | do | do | do | 10 mins. |

A = Composition of the present invention comprising 2:4-dichlorobenzyl alcohol, 1.2 mg., amyl-m-cresol, 0.6 mg.
B = Commercially available composition comprising tyrothricin, 1 mg.
C = Commercially available composition comprising dequalinium hydrochloride, 0.25 mg.
D = Commercially available composition comprising domiphen bromide, 0.5 mg.
E = Commercially available composition comprising chlorhexidine dihydrochloride, 5 mg.

The compositions of the invention which are suitable for topical use include ointments, lotions, jellies and eardrops containing 2:4-dichlorobenzyl alcohol as the active ingredient. Suitable ointments and creams are water-miscible or water-immiscible in character and include those of the oil-in-water emulsion and water-in-oil emulsion types which are prepared from emulsifying waxes and oils and those which are derived from water-miscible polyethylene glycols. Such ointments and creams may contain 2:4-dichlorobenzyl alcohol as the sole active ingredient or may contain a mixture of this compound and e.g. amyl-m-cresol or hexachlorophene. The ointments and creams may also comprise a small quantity of an antifoaming agent, for example, a silicone which facilitates the application of the preparation to the skin, and a stabilising agent. A substance which is particularly suitable for use in the latter capacity is citric acid, which in addition to preventing discolouration of the ointments and creams on storage, can be used to adjust the pH of the preparation approximately to that of normal skin.

The compositions of the invention which may be employed as eardrops comprise 2:4-dichlorobenzyl alcohol in association with a relatively non-volatile liquid diluent which is innocuous when instilled into the ear. A diluent which has been found to be particularly suitable is propylene glycol in which 2:4-dichlorobenzyl alcohol is soluble. The ear drop compositions may include a stabilising agent, for example, citric acid to inhibit discolouration.

The compositions of the invention which may be employed as fungicidal and bactericidal mouth washes and lotions comprise 2:4-dichlorobenzyl alcohol and, if desired, other active components such as amyl-m-cresol or hexachlorophene in association with a liquid solvent diluent. In the case of lotions, in particular lotions intended for application to the scalp for the treatment of dandruff, the bulk of the liquid solvent diluent is preferably a lower aliphatic alcohol, for example ethyl alcohol, which may also contain a minor proportion of water. Where the lotion is intended for use as a scalp lotion by regular application to the hair, the composition may also comprise an oil, for example, isopropyl myristate, of the type normally employed in dressings for the hair. The compositions may also comprise other active ingredients which are commonly employed in scalp lotions, for example, hexachlorophene, salicylic acid, cetrimide etc. The concentration of 2:4-dichlorobenzyl alcohol which is employed in lotions is not critical but it has been found

*Example 1*

An intimate mixture of the following ingredients is compounded into lozenges each of which weighs one gram and contains 25 mg. of 2:4-dichlorobenzyl alcohol.

Parts by weight
2:4-dichlorobenzyl alcohol _____ 25
Acacia gum _____ 58
Magnesium stearate _____ 5
Sucrose to make 1,000 parts by weight.

*Example 2*

Lozenges each of weight 1.3 grams and of the following compositions are prepared as described below.

Milligrams
2:4-dichlorobenzyl alcohol _____ 5
Saligenin _____ 50
Carbowax 6000 [a proprietary form of polyethylene glycol] _____ 40
Magnesium stearate _____ 7
Tragacanth _____ 58
Tartaric acid _____ 13
Flavouring essence _____ 0.004
Icing sugar to make 1.3 grams.

The icing sugar and tartaric acid are thoroughly mixed and treated with a solution of the 2:4-dichlorobenzyl alcohol, saligenin and Carbowax 6,000 in a small quantity of industrial methylated spirit. The product is thoroughly mixed and allowed to dry. The dried mixture is passed through a sieve of mesh 40, the tragacanth is added and mixed thoroughly before the mixture is granulated by treatment with a dilute syrup followed by drying at a temperature not exceeding 110° F. The granulated material is treated with the flavouring essence and the mixture is allowed to stand overnight in a closed container before being treated with magnesium stearate and compressed into lozenges on the appropriate machine.

*Example 3*

A batch of throat sweets of approximately 60 pounds weight is prepared from the following ingredients by the method described below.

Sugar _____ 42 pounds.
Liquid glucose B.P _____ 21 pounds.
Tartaric acid B.P _____ 9 ounces, 262 grains.
2:4-dichlorobenzyl alcohol _____ 252 grains.
Amyl-m-cresol _____ 210 grains.
Flavour _____ A sufficient quantity.
Colour solution _____ Do.
Water _____ Do.

A syrup is prepared by adding the sugar and the liquid glucose B.P. to a sufficient quantity of water and then boiling until a temperature of 275° C. is attained. The tartaric acid is added to the hot syrup followed by sufficient colour solution to give the required colour and finally the 2:4-dichlorobenzyl alcohol is added together with amyl-m-cresol and the required flavouring matter. The composition is thoroughly mixed and passed through a drop forming machine so that ten of the resulting boiled sweets weigh approximately one ounce.

*Example 4*

A water-miscible cream is prepared by dissolving 2 parts by weight of 2:4-dichlorobenzyl alcohol in 98 parts by weight of a polyethylene glycol 1,500 available under the proprietary name of "Carbowax 1500."

*Example 5*

An ear drop composition is prepared by dissolving 1.5 parts by weight of 2:4-dichlorobenzyl alcohol in propylene glycol using a high speed stirrer and making up to 100 parts by volume with propylene glycol.

*Example 6*

A formulation suitable for use as a scalp lotion and of the following composition is prepared by stirring all the ingredients with the industrial methylated spirit until a clear solution is obtained.

| | Parts by weight |
|---|---|
| 2:4-dichlorobenzyl alcohol | 0.5 |
| Hexachlorophene | 0.2 |
| Salicylic acid | 1.0 |
| Cholesterol | 0.2 |
| Cetrimide B.P. | 0.5 |
| Isopropyl myristate | 8.0 |
| Quassia, 5% aqueous solution | 0.22 |
| Colour | 0.0015 |
| Perfume | 0.3 |

Industrial methylated spirit to make 100 parts by weight.

*Example 7*

An oily formulation suitable for use as a scalp lotion is prepared according to the method described in Example 6, the proportion of isopropyl myristate being increased to 18.0 parts by weight.

*Example 8*

An antiseptic jelly is prepared from the following ingredients by the method described below

| | |
|---|---|
| 2:4-dichlorobenzyl alcohol | 2.5 parts by weight. |
| Carbopol 934 (a proprietary name for a synthetic gum) | 1.5 parts by weight. |
| Triethanolamine | 0.5 part by weight. |
| Propylene glycol | 74.0 parts by weight. |
| Perfume | A sufficient quantity. |

Water to make 100 parts by weight.

The Carbopol 934 is dispersed in 64 parts of propylene glycol and the triethanolamine is dissolved in sufficient water and added with stirring.

A solution of the 2:4-dichlorobenzyl alcohol in 10 parts of propylene glycol is added followed by a sufficient quantity of the required perfume and the whole is thoroughly mixed until uniform.

*Example 9*

An ear canker powder for veterinary purposes is prepared by thoroughly mixing the following ingredients in a powder mixer.

| | Parts by weight |
|---|---|
| 2:4-dichlorobenzyl alcohol | 0.5 |
| Hexachlorophene | 1.0 |
| γ Benzene hexachloride | 0.2 |
| Boric acid B.P. | 10.0 |
| Zinc oxide B.P. | 5.0 |
| Benzocaine B.P. | 2.5 |
| Magnesium stearate | 2.0 |
| Purified talc | 20.0 |
| Light kaolin B.P. | 58.8 |

*Example 10*

A wound and strike powder for veterinary purposes is prepared by thoroughly mixing the following ingredients in a powder mixer.

| | Parts by weight |
|---|---|
| 2:4-dichlorobenzyl alcohol | 0.5 |
| Dieldrin | 0.4 |
| Boric acid | 5.0 |
| Starch (pre-cooked) | 94.1 |

*Example 11*

A tooth paste is prepared containing the following ingredients by the method described below:

| | Parts by weight |
|---|---|
| Glycerin | 20 |
| Water | 28 |
| Tragacanth | 1 |
| Oil of peppermint | 1 |
| Soluble saccharin | 0.1 |
| Heavy calcium carbonate | 2.4 |
| Light calcium carbonate | 2.4 |
| Sodium lauryl sulphate | 0.2 |
| 2:4-dichlorobenzyl alcohol | 0.2 |

A mucilage is prepared by adding tragacanth to a stirred solution of the soluble saccharin and glycerin in water. The calcium carbonate is incorporated in a kneading machine and the 2:4-dichlorobenzyl alcohol dissolved in the oil of peppermint is added. The sodium lauryl sulphate is then added, it is thoroughly mixed and finally the paste is milled.

*Example 12*

An antiseptic composition is prepared containing the following ingredients:

| | | |
|---|---|---|
| 90% alcohol | percent v./v. | 36 |
| Amyl-m-cresol | do | 0.125 |
| 2:4-D.C.B.A. | percent w./v. | 0.5 |
| Tartaric acid | do | 0.2 |
| Saccharin | do | 0.1 |
| Menthol | do | 0.045 |
| Thymol | do | 0.06 |
| Eucalpytol | percent v./v. | 0.1 |
| Oil of aniseed | do | 0.02 |
| Oil of camphor (rectified) | do | 0.004 |
| Oil of peppermint | do | 0.004 |
| Choloform B.P. | do | 0.17 |
| Glycerin B.P. | do | 40.0 |
| Yellow acid CYR (Williams) | percent w./v. | 0.002 |

Water to 100%.

The ingredients, with the exception of the colouring material are dissolved in the alcohol and most of the required water containing the colouring material is added with stirring. A final addition of water to 100% is made to give a concentrated solution which may be diluted to give a mouth wash.

I claim:
1. A method of combatting bacterial, fungal and yeast infections of the mouth and throat which comprises applying to the infected parts a composition comprising 2:4 dichlorobenzyl alcohol and amyl-m-cresol as active ingredients and a pharmaceutically acceptable diluent.
2. A method according to claim 1 in which said com- position also contains a pharmaceutically acceptable acid.

3. An oral pharmaceutical composition 2:4-dichlorobenzyl alcohol and amyl-m-cresol as effective ingredients and a pharmaceutically acceptable carrier.

4. An oral pharmaceutical composition in the form of a boiled sweet and comprising 0.75 to 1.5 parts by weight of 2:4 dichlorobenzyl alcohol, 0.5 to 1 part by weight of amyl-m-cresol, 20 to 30 parts by weight of tartaric acid and 2500 to 3000 parts by weight of a sugar base.

5. An oral pharmaceutical composition in the form of a boiled sweet and comprising between 0.25 and 3 parts by weight of 2:4-dichlorobenzyl alcohol, 0.1 and 2 parts by weight of amyl-m-cresol, 10 to 50 parts by weight of tartaric acid and 2,000 to 4,000 parts by weight of sugar base.

References Cited in the file of this patent

UNITED STATES PATENTS

| | | |
|---|---|---|
| 2,380,011 | Baker et al. | July 10, 1945 |
| 2,689,814 | Nicholls | Sept. 21, 1954 |

FOREIGN PATENTS

| | | |
|---|---|---|
| 727,035 | Great Britain | Mar. 30, 1955 |
| 762,388 | Great Britain | Nov. 28, 1956 |
| 794,402 | Great Britain | May 7, 1958 |
| 885,966 | France | Sept. 30, 1943 |

OTHER REFERENCES

Sindar Corporation, Technical Bulletin H-1, May 1952, pp. 1–15.

Chemical Abstracts, vol. 49, April–May 1955.

Paper #14, 95th Annual Meeting, British Pharmaceutical Conference, Llandudno, September 1958, "The Preparation and the Antibacterial and Antifungal Properties of Some Substituted Benzyl Alcohols," D. V. Carter et al., published December 1958, The Journal of Pharmacy and Pharmacology (Great Britain), vol. X, Supplement, pp. 149T–159T.